United States Patent [19]

Vanderpool et al.

[11] Patent Number: 5,819,158
[45] Date of Patent: Oct. 6, 1998

[54] RECLAMATION OF TUNGSTEN VALUES FROM TUNGSTEN-THORIA

[75] Inventors: Claraence D. Vanderpool; Thomas A. Wolfe; Michael J. Miller, all of Towanda, Pa.

[73] Assignee: Osram Sylvania Inc., Danvers, Mass.

[21] Appl. No.: 866,876

[22] Filed: May 30, 1997

[51] Int. Cl.$^6$ .......................... C22B 60/00; C22B 34/30; C01G 41/00
[52] U.S. Cl. .................................. 423/5; 423/61
[58] Field of Search ............................. 423/61, DIG. 12, 423/5

[56] References Cited

U.S. PATENT DOCUMENTS

| | | | |
|---|---|---|---|
| 3,887,680 | 6/1975 | MacInnis et al. | 423/55 |
| 4,298,581 | 11/1981 | Douglas et al. | 423/58 |
| 4,320,094 | 3/1982 | Menashi et al. | 423/56 |
| 4,603,043 | 7/1986 | Douglas et al. | 423/593 |
| 4,966,760 | 10/1990 | Ladd et al. | 423/53 |

FOREIGN PATENT DOCUMENTS 1037952  8/1966  United Kingdom ....................... 423/5

OTHER PUBLICATIONS

K.C. Li, Tungsten: Its History, Geology, Ore–Dressing, Metallurgy, Chemistry, Analysis, Applications and Economics, Chapter IV, pp. 166–184, 209–212, 265–269, Third Ed. (1955) no month,

*Primary Examiner*—Steven Bos
*Attorney, Agent, or Firm*—Robert F. Clark

[57] ABSTRACT

A simple, cost effective method for reclaiming tungsten values from tungsten-thoria has been invented. The method involves reacting the tungsten-thoria with molten sodium hydroxide to form a soluble sodium tungstate and an insoluble residue of thoria, cooling the melt, dissolving the melt in water, and filtering to separate the insoluble residue of thoria from the dissolved sodium tungstate. The method resulting in substantially all of the tungsten values being reclaimed as sodium tungstate and acutely reducing the amount of radioactive material for disposal.

20 Claims, 1 Drawing Sheet

RECLAMATION OF TUNGSTEN VALUES FROM TUNGSTEN-THORIA

TECHNICAL FIELD

This invention relates to the field of reclaiming tungsten values from tungsten alloys. In particular, this invention relates to reclaiming tungsten values from tungsten alloys containing thoria.

BACKGROUND ART

Tungsten-thoria is a tungsten alloy containing fine particulates of thorium oxide (thoria) dispersed throughout the tungsten matrix. Some of the applications for tungsten-thoria include the making of filament wire for the lighting industry and rods for the welding industry. Scrap tungsten-thoria which is produced in the manufacturing of these products may not be easily disposed of because of the radioactive properties of the thoria. Since the thoria typically comprises about 0.5 to 2 weight percent of the tungsten-thoria, it would be desirable to separate the thoria from the tungsten-thoria so that the total mass of radioactive material is substantially reduced and can be disposed of more easily.

One generally used method for reclaiming tungsten from tungsten scrap involves an oxidizing fusion process whereby the tungsten metal is converted into a soluble tungstate such as sodium tungstate. Tungsten scrap is combined with strong oxidizers such as nitrates, peroxides, or chlorates, and heated to initiate a highly exothermic reaction whereby the soluble tungstate is formed. For example, U.S. Pat. No. 4,603,043 describes a fusion process using a combination of sodium nitrate and sodium hydroxide to covert tungsten to sodium tungstate. However, because of the violent and potentially explosive nature of the exothermic reactions caused by these oxidizers, these methods are unsuitable for use with tungsten-thoria because of the increased potential for the release of radioactive thoria particles. Therefore, it would be advantageous to have a method for efficiently recovering tungsten values from tungsten-thoria which minimizes the risk of releasing hazardous quantities of thoria particles into the atmosphere.

SUMMARY OF THE INVENTION

It is an object of the invention to obviate the disadvantages of the prior art.

It is another object of the invention to provide a method for reclaiming tungsten values from tungsten-thoria without releasing hazardous amounts of thoria particles into the environment.

It is a further object of the invention to reduce the amount of thoria containing material for disposal.

In accordance with one aspect the invention, there is provided a method for reclaiming tungsten values from tungsten-thoria, comprising: placing an amount of tungsten-thoria in a crucible with an amount of a reactant sufficient to convert the tungsten contained in the tungsten-thoria to a soluble sodium tungstate, the reactant consisting essentially of sodium hydroxide; heating the crucible to a reaction temperature, the reaction temperature being sufficient to melt the sodium hydroxide and cause a reaction between the sodium hydroxide and the tungsten contained in the tungsten-thoria; maintaining the crucible at the reaction temperature for a time sufficient to convert substantially all of the tungsten-thoria into a soluble sodium tungstate and an insoluble thoria residue; cooling the crucible and separating the soluble sodium tungstate from the insoluble thoria residue.

In accordance with another aspect of the invention, the method yields a tungsten recovery efficiency of at least about 90%.

DESCRIPTION OF PREFERRED EMBODIMENTS

Figure 1:
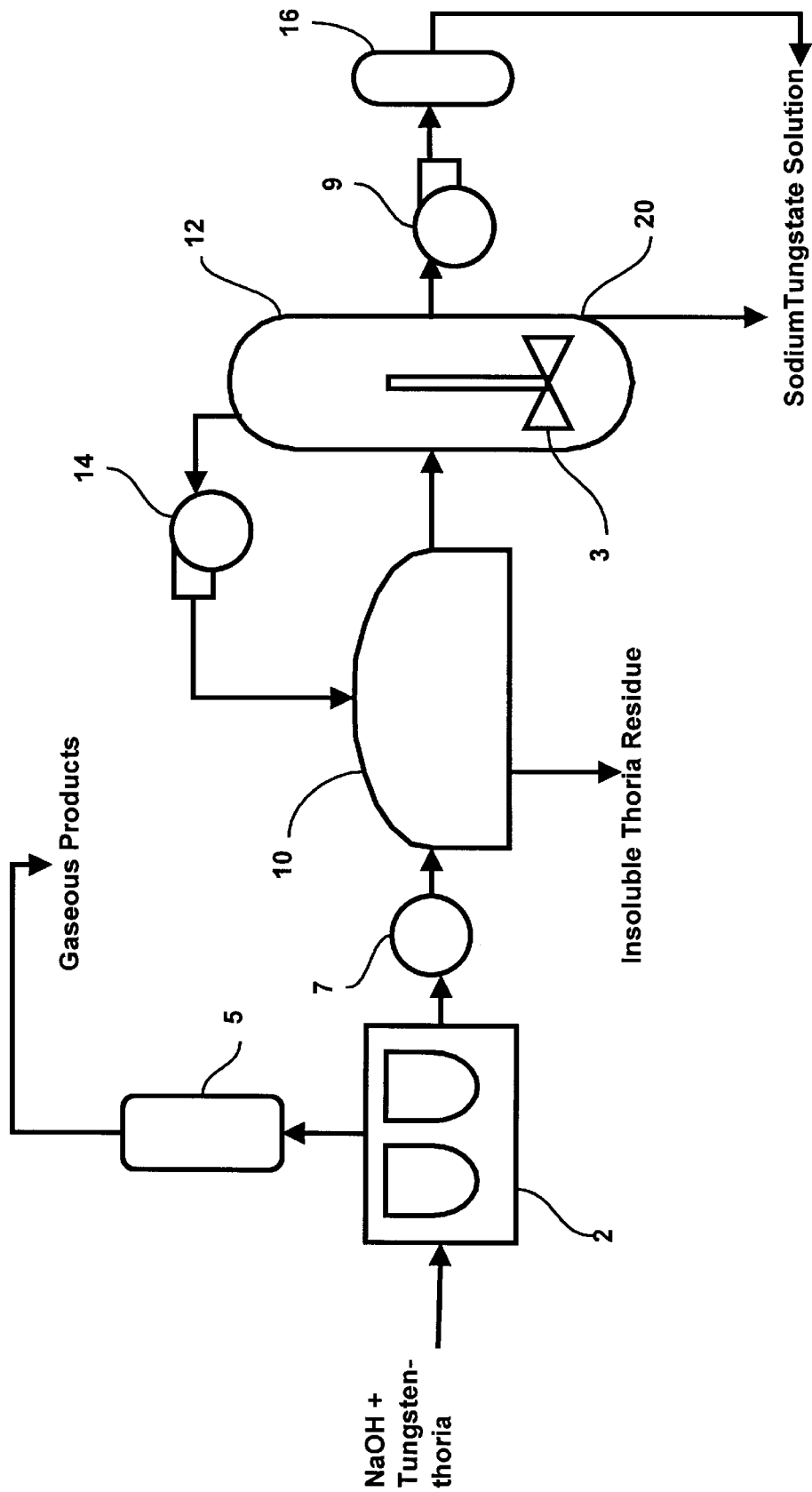
FIG. 1 is a schematic representation of an example of the implementation of the process on a production scale.

For a better understanding of the present invention, together with other and further objects, advantages and capabilities thereof, reference is made to the following disclosure and appended claims and drawing.

In order to reclaim the tungsten values from tungsten-thoria scrap, the tungsten-thoria is reacted with molten sodium hydroxide, NaOH. No additional oxidizer is required. Substantially all of the tungsten is converted by the fusion reaction to a soluble sodium tungstate. The thoria, which is dispersed throughout the tungsten, doesn't react and remains as an insoluble residue in the melt. As a result, the melt produced in the fusion reaction consists primarily of a soluble sodium tungstate and an insoluble thoria residue. The thoria is then separated from the tungsten values in the melt by dissolving the melt in water and filtering.

The process used in this invention produces a gentler and more controllable fusion reaction than processes which use a strong oxidizer such as sodium nitrate. The elimination of the strong oxidizer allows the thoria to be separated from the tungsten without substantial risk of thoria particle emission during the fusion reaction. The process further eliminates the foaming caused by the nitrate oxidizer and the need to scrub $NO_x$ gas from the gaseous products formed during the fusion. Also, by keeping the thoria particles wet during the separation step, the danger of introducing thoria dust into the atmosphere is further limited.

An example of the implementation of the process on a production scale is presented in FIG. 1. It is preferred that most of the equipment including the reactor vessel should be made of a polished stainless steel having ground seams (pharmaceutical grade) to prevent sticking of the thoria insoluble. Referring to FIG. 1, the tungsten-thoria scrap and NaOH are reacted in a temperature controlled fusion reactor 2 which is connected to scrubber 5. (The scrubber may not be necessary since combustion of the hydrogen gas evolved during the fusion has been observed to occur near the surface of the melt.) Once the fusion reaction is completed, the melt while still at least partially molten is poured into flaker 7 which operates to break the melt into small, easily dissolved, pieces. The output from the flaker enters Nutsche filter 10 where the sodium tungstate is dissolved and separated from the insoluble residue. The Nutsche filter 10 should have a pore size small enough to retain the insoluble thoria residue. The filtrate containing the sodium tungstate is sent to tank 12 containing agitator 3. A portion of the sodium tungstate solution may be recirculated back into the Nutsche filter 10 using recirculating pump 14. The recirculation is used primarily to establish a filter cake on the filter. This prevents thoria particles which may pass through the filter initially because the filter cake hasn't been established from being discharged with the sodium tungstate solution. Once the thoria particles have been removed, the sodium tungstate solution is then discharged through port 20. Further processing may be necessary to remove any solubilized thoria daughter products. This is accomplished by adding a soluble alkaline earth metal compound (barium chloride being preferred) to the sodium tungstate solution, adjusting the pH of the solution to between about 8.5 to about 10.5 (about 9.5 being preferred) to precipitate the thoria daughter products, and pumping the solution through filter 16 using filter pump 9.

This simple, cost effective method reclaims substantially all of the initial tungsten contained in the tungsten-thoria while concentrating the radioactive thoria for disposal or reclamation. Tungsten recovery efficiencies of at least about 90% and preferably, at least about 95% have been achieved. The solubilized sodium tungstate recovered from the fusion process may be further purified or converted into tungsten metal by known conventional means. Such conventional methods are described in U.S. Pat. Nos. 4,603,043 and 3,887,680. The solid residue which remains after filtration contains the insoluble thoria particles and constitutes in general only about 2 weight percent (2 wt. %) of the initial tungsten-thoria scrap. This substantially smaller amount of radioactive material can now be more easily and economically disposed of or reused.

The following non-limiting examples are presented.

EXAMPLE 1

A solid 37.4 g piece of tungsten-thoria was placed in an alumina crucible and covered with 131.0 g of NaOH pellets. The weight ratio of NaOH to tungsten-thoria being about 3.5:1 (a NaOH:W molar ratio of 16:1). The crucible was heated in a furnace to 800° C. causing the NaOH to melt and boil. A popping sound and yellow flame were observed which was believed to be caused by hydrogen generated from the reaction. After about 40 minutes, the boiling stopped and no flame or popping noises were observed. The crucible was removed from the furnace and allowed to cool. The contents of the crucible were dissolved in 500 ml of hot water. The insoluble residue containing the thoria particles was filtered out, dried and weighed. The amount of insoluble residue was 0.9837 g or 2.63% by weight of the initial tungsten-thoria. The sodium tungstate contained in the filtrate contained 98.07% of the initial tungsten.

EXAMPLE 2

A solid 63.4 g piece of tungsten-thoria was placed in an alumina crucible and covered with 121.9 g of NaOH pellets. The weight ratio of NaOH to tungsten-thoria was lower than in Example 1, about 1.7:1 (a NaOH:W molar ratio of 8.8:1). The tungsten-thoria was then reacted as in Example 1 at 800° C. for about 2 hours. The weight of the insoluble residue recovered after filtering and drying was 1.1573 g or 1.8% by weight of the tungsten-thoria. The sodium tungstate solution recovered contained 99.4% of the initial tungsten.

EXAMPLE 3

A 10 gram sample of tungsten-thoria grinding sludge containing 55 wt. % tungsten was placed in an alumina crucible and dried overnight at 110° C. to remove some of the organic cutting oils and/or water. About 19.25 g of NaOH pellets were added (about the same weight ratio of NaOH to tungsten-thoria as in Example 1). The tungsten-thoria was reacted at 750° C. for about an hour. After cooling, the melt was dissolved in 100 ml of hot water. The solution was found to contain 95% of the initial tungsten.

In each of the above examples, at least about 95% of the initial tungsten present in the tungsten-thoria was recovered as solubilized sodium tungstate. Additional investigations showed that substituting either NaCl or $Na_2CO_3$ for NaOH in the reaction would not produce the same results. Thus, the preferred reactant is NaOH.

A more systematic analysis of the tungsten recovery efficiencies was conducted. In a first series, the molar ratio of sodium hydroxide to tungsten was varied from 7:1 to 11:1 and the reaction temperatures were varied from 750° C. to 850° C. The fusion procedures used were similar to the procedure used in Examples 1–3. The fusions were allowed to continue until the reaction visually appeared to end. The reaction times ranged from about 33 to 93 minutes. The tungsten recovery efficiencies are given in table 1. As used herein, the tungsten recovery efficiency is defined as $W_{rec}/(W_{rec}+W_{res})$ where $W_{rec}$ is the amount of tungsten recovered as sodium tungstate and $W_{res}$ is the amount of tungsten in the solid residue.

TABLE 1

| Example | Molar Ratio (NaOH:W) | Temperature (°C.) | Tungsten Recovery Efficiency (%) |
|---|---|---|---|
| 4 | 7 | 750 | 57 |
| 5 | 11 | 750 | 89 |
| 6 | 7 | 850 | 100 |
| 7 | 11 | 850 | 91 |
| 8 | 9 | 800 | 95 |
| 9 | 9 | 800 | 98 |

The single major effect on the tungsten recovery efficiency was temperature. As temperature increased, the average tungsten recovery efficiency increased from 73 to 96%. At the higher molar ratio, temperature had no effect, However, at the lower molar ratio, as the temperature increased from 750° to 850° C., the tungsten efficiencies increased from 57 to 100%. The higher temperatures also had the effect of decreasing the observed reaction times.

The molar ratio of sodium hydroxide to tungsten had a lesser effect than temperature on the tungsten recovery efficiencies over the range tested. As the molar ratio increased, the average tungsten recovery efficiency increased from 79 to 90%.

In a second series of samples, the molar ratio of sodium hydroxide to tungsten was held constant at 7:1 and the reaction times and temperatures were varied. The fusion procedures used were similar to the procedure used in Examples 1–3. The tungsten recovery efficiencies for this series is reported in table 2.

TABLE 2

| Example | Time (hours) | Temperature (°C.) | Tungsten Recovery Efficiency (%) |
|---|---|---|---|
| 10 | 1 | 750 | 64 |
| 11 | 2 | 750 | 58 |
| 12 | 1 | 850 | 100 |
| 13 | 2 | 850 | 100 |
| 14 | 1.5 | 800 | 92 |
| 15 | 1.5 | 800 | 94 |

The variation in reaction time had essentially no effect on tungsten recovery efficiency. However, as above, the variation in temperature affected significantly the tungsten recovery efficiency. As the temperature increased from 750° to 850° C., the average tungsten recovery efficiency increased from 61 to 100%. Also, at the 7:1 NaOH:W molar ratio, the reaction temperature needs to be at least about 800° C. to achieve tungsten recovery efficiencies of at least about 90%.

There results demonstrate that the method of this invention yields high recovery efficiencies without the an additional strong oxidizer (i.e. nitrate, peroxide, etc.). In particular, tungsten recovery efficiencies of at least about 90% were realized using a sodium hydroxide to tungsten molar ratio of at least 7:1 and a reaction temperature of at least about 750° C. Although temperatures greater than 850° C. may be used, the preferred temperature range is between about 750° C. to about 850° C.

As shown above, molar ratios of sodium hydroxide to tungsten greater than 11:1 may be used. However, high tungsten recovery efficiencies can be obtained with lower amounts of hydroxide. Thus, for economic reasons, the preferred NaOH:W molar ratio is between about 7:1 to about 11:1. The most preferred conditions are a NaOH:W molar ratio of about 7:1 and a reaction temperature of about 850° C.

The numerous samples, solutions, sludges, and products examined were counted on a gamma scintillation spectrometer and full energy profiles were performed for many samples. Although thoria is an alpha emitter, there exist several gamma emitting daughter products for thoria $^{228}$Ra, $^{228}$Ac, $^{216}$Po, $^{212}$Pb, $^{212}$Bi, and $^{208}$Tl. In several of the final sodium tungstate solutions, traces of $^{228}$Ra, $^{228}$Ac, and $^{212}$Pb were detected. These solubilized daughter products could be precipitated and removed, if required, via addition of barium chloride, 0.5 g BaCl$_2$/100 ml Na$_2$WO$_4$ solution, and pH adjustment with concentrated sulfuric acid to a pH of 9.5, followed by filtration.

While there has been shown and described what are at the present considered the preferred embodiments of the invention, it will be obvious to those skilled in the art that various changes and modifications may be made therein without departing from the scope of the invention as defined by the appended claims.

We claim:

1. A method for reclaiming tungsten values from tungsten-thoria, comprising:
    placing an amount of tungsten-thoria in a crucible with an amount of a reactant sufficient to convert the tungsten contained in the tungsten-thoria to a water soluble sodium tungstate, the reactant consisting essentially of sodium hydroxide;
    heating the crucible to a reaction temperature, the reaction temperature being sufficient to melt the sodium hydroxide and cause a reaction between the sodium hydroxide and the tungsten contained in the tungsten-thoria without adding an additional oxidizer;
    maintaining the crucible at the reaction temperature for a time sufficient to convert substantially all of the tungsten-thoria into a water soluble sodium tungstate and a water insoluble thoria residue;
    cooling the crucible and separating the water soluble sodium tungstate from the water insoluble thoria residue.

2. The method of claim 1 wherein separating the water soluble sodium tungstate from the water insoluble thoria residue comprises dissolving the water soluble sodium tungstate and filtering.

3. The method of claim 1 wherein the molar ratio of sodium hydroxide to tungsten is at least about 7:1.

4. The method of claim 1 wherein the molar ratio of sodium hydroxide to tungsten is from about 7:1 to about 11:1.

5. The method of claim 1 wherein the molar ratio of sodium hydroxide to tungsten is about 7:1.

6. The method of claim 1 wherein the reaction temperature is at least about 750° C.

7. The method of claim 1 wherein the reaction temperature is from about 750° C. to about 850° C.

8. The method of claim 1 wherein the method yields a tungsten recovery efficiency of at least about 90%.

9. The method of claim 1 wherein the method yields a tungsten recovery efficiency of at least about 95%.

10. The method of claim 3 wherein the reaction temperature is at least about 750° C.

11. The method of claim 3 wherein the reaction temperature is from about 750° C. to about 850° C.

12. The method of claim 3 wherein the method yields a tungsten recovery efficiency of at least about 90%.

13. The method of claim 3 wherein the method yields a tungsten recovery efficiency of at least about 95%.

14. The method of claim 4 wherein the reaction temperature is at least about 750° C.

15. The method of claim 4 wherein the reaction temperature is from about 750° C. to about 850° C.

16. The method of claim 4 wherein the method yields a tungsten recovery efficiency of at least about 90%.

17. The method of claim 4 wherein the method yields a tungsten recovery efficiency of at least about 95%.

18. The method of claim 5 wherein the reaction temperature is at least about 800° C. and the method yields a tungsten recovery efficiency of at least about 90%.

19. The method of claim 5 wherein the reaction temperature is about 850° C. and the method yields a tungsten recovery efficiency of about 100%.

20. The method of claim 2 wherein a soluble alkaline earth metal compound is added to the filtered sodium tungstate and the pH is adjusted to between about 8.5 to about 10.5 to precipitate thoria daughter products.

* * * * *